O. L. BURFORD AND H. DE BARDELEBEN.
WINDING SHAFT AND CHAIN GUARD FOR DUMP CARS.
APPLICATION FILED JUNE 16, 1921.
1,423,752.
Patented July 25, 1922.
2 SHEETS—SHEET 1.
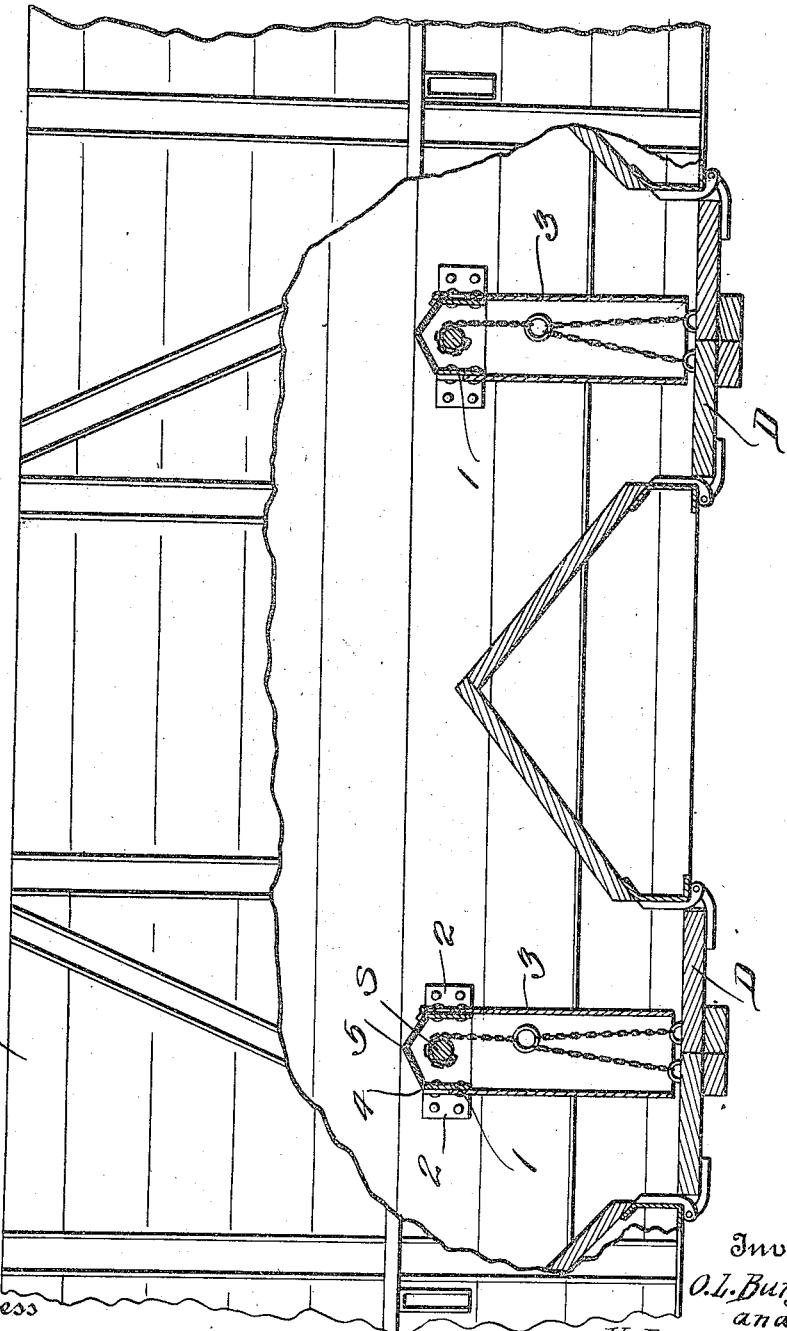

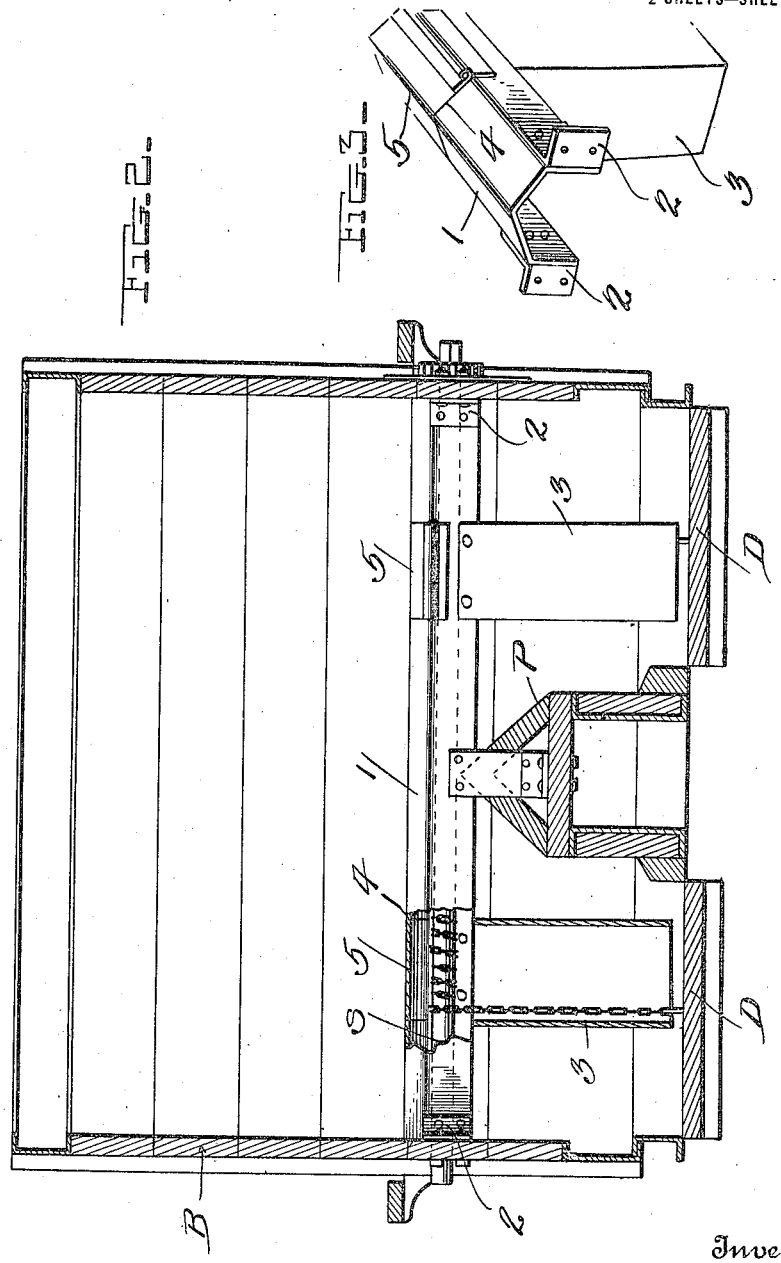

UNITED STATES PATENT OFFICE.

OLIVER L. BURFORD AND HUBERT DE BARDELEBEN, OF ENSLEY, ALABAMA.

WINDING SHAFT AND CHAIN GUARD FOR DUMP CARS.

1,423,752.   Specification of Letters Patent.   Patented July 25, 1922.

Application filed June 16, 1921. Serial No. 478,119.

*To all whom it may concern:*

Be it known that we, OLIVER L. BURFORD and HUBERT DE BARDELEBEN, citizens of the United States, residing at Ensley, in the county of Jefferson and State of Alabama, have invented certain new and useful Improvements in Winding Shafts and Chain Guards for Dump Cars; and we do declare the following to be a full, clear, and exact description of the invention, such as will enable others skilled in the art to which it appertains to make and use the same.

This invention relates broadly to improvements in dump cars and has more particular reference to an improved structure for guarding the chains and shafts of such cars which are used for opening and closing the doors in the bottom of the car during the dumping operation, it being the object of the invention to practically house the chains and shaft so that the coal or other contents of the car will not bind against the shaft or chain or interfere in any way with the operation of these parts as otherwise occurs.

The principal object of the invention is to provide a guard which partially covers the shaft throughout the entire length of the latter, also covers that portion of the chain which is wound on the shaft and houses the vertical portions of the chains which are connected with the retractable doors in the bottom of the car, in this way housing and protecting all parts of the door-operating mechanism which are ordinarily interfered with when the coal is in the frozen state or even in an unfrozen state.

Another and important object of the invention is to generally improve upon devices of this class by the provision of one of extreme simplicity and durability in which few and simple parts are employed in the make-up of the device and the device as an entirety is rendered extremely inexpensive to both the manufacturer and the user.

A further and important object of the invention is to provide a guard of this class wherein the portion thereof which houses the shaft is formed with an opening through which the chain and shaft can be easily and readily inspected, for making repairs or for any other reasons, this opening being normally closed by a hinged door and thus providing an effective and highly desirable arrangement.

A still further object of the invention is to provide a device of this class which is such in construction that it can be installed in practically all conventional types of dump cars now in use without requiring any alterations of the car or any parts thereof.

Other objects, features and advantages of the invention will become apparent as the description goes on.

In the accompanying drawings forming a part of this specification and in which like numerals are employed to designate like parts throughout the same:

Figure 1 is a central longitudinal sectional view through a portion of a dump car equipped with chain and shaft guards constructed in accordance with this invention.

Figure 2 is a transverse sectional view taken through the car and showing the greater portion of the guards in elevation.

Figure 3 is a detail perspective view of one end of the device.

Referring to the drawings, the letter B designates generally a dump car body, which, as is usual, is provided with a longitudinally extending centrally disposed partition P, transverse hinged doors D, a transverse shaft S above these doors, and flexible chains or other suitable flexible elements connected with the shaft and doors in the manner indicated. All of these parts are old and well known and constitute no part of this invention.

The invention, as before indicated, resides in the employment of means for guarding the chains and shaft to prevent direct contact of the contents of the car with the shaft and chains so that the latter will not be interfered with in any way during the opening and closing of the doors. We have shown two separate guards but it will be necessary only to refer to a single one of these since the corresponding parts of both are duplicates of one another. In the preferred embodiment, the invention comprises an inverted channel-shaped guard 1 for transverse disposition between the sides of the car body, the same being disposed over and practically covering the shaft S throughout the entire length of the latter. Brackets 2 of suitable form are employed for connecting the opposite ends of this guard 1 with the side walls of the car body. As before indicated, the guard 1 serves to protect and cover the shaft and portion of the chains which are wound on this shaft. It is also desirable to protect that portion of the chain which extends between the shaft and doors D. Therefore, we make us of one or more depending substantially rectangular guards 3 which are connected with the open bottom face of the guard 1 and extend into close proximity to the doors D as shown, these being arranged at points where they will surround the vertically disposed portions of the chains. By employing these several guards, the shaft and chains are almost completely housed and the contents of the car is prevented from coming into contact with these parts and interfering with the operation thereof. At this point we wish to make it known that openings 4 are formed in the top portion of the guard 1 at points directly over the upper ends of the guards 3 so as to permit access to be had to the shaft and chains and to permit these parts to be inspected whenever necessary or desired. With this construtcion and arrangement, it is possible to replace the chains without removing the guards or shaft. It is desirable, of course, to provide means for normally closing these openings 4, and we therefore provide hinged closures 5 for covering these openings. The employment of these openings and doors will enable repairs to be made and frequent inspection of the chains and shaft and is one of the very important features of the invention and should be very carefully considered.

At this point we may state that we are aware of the fact that protecting devices for shafts and chains for dump cars have heretofore been patented and probably used, but we are not aware of any single device which embodies a structure for not only protecting the shaft throughout its entire length and protecting the portions of the chains which are wound on this shaft, but includes means for protecting that portion of the chains which extend between the shaft and doors in the bottom of the body. Furthermore, we do not know of any device of this class possessing the feature of enabling an inspection of the chains and shaft to be made and permitting repairs and replacements to be made if found necessary after such inspection. We therefore feel that our invention possesses many features and advantages not heretofore obtained by patented and marketed devices for the same purpose, and inasmuch as the several features and advantages have been made apparent from the foregoing description, we believe that it will be unnecessary to describe the invention further.

In all probability the best results can be obtained with the construction and arrangement herein shown and described. For this reason, this is taken as the preferred embodiment of the invention. However, slight minor changes coming within the scope of the adjoining claim may be resorted to if desired.

We claim:

The combination with a dump car having bottom closures movable vertically into and out of a closed position, a winding shaft extending through the car over the closures and chains wound upon the shaft and extending downwardly therefrom and connected with the closures; of an inverted channel-shaped guard extending through the car and extending above and upon opposite sides of the shaft, said guard being connected at its ends with the walls of the car body, depending hollow arms connected with the guard and extending downwardly therefrom and positioned about the depending portions of said chains, said channel-shaped guard being formed with inspection openings over said depending hollow arms, and hinged closures for said openings.

In testimony whereof we have hereunto set our hands.

OLIVER L. BURFORD.
HUBERT DE BARDELEBEN.